Figure 1:
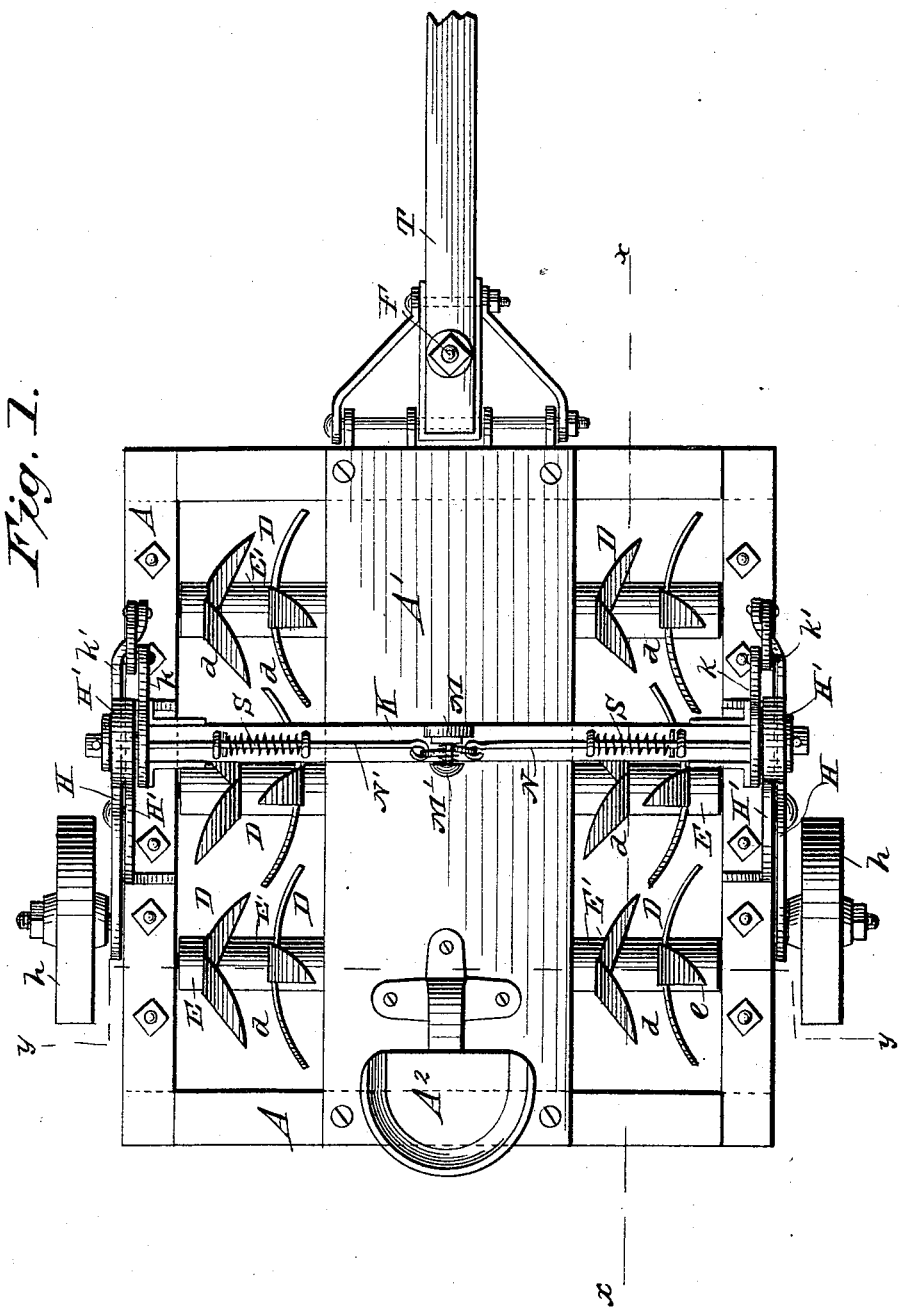

(No Model.) 3 Sheets—Sheet 1.

A. MADSON.
SOD CUTTER AND PULVERIZING HARROW.

No. 396,166. Patented Jan. 15, 1889.

WITNESSES:
Phil C. Dietrich.
C. Sedgwick

INVENTOR:
A. Madson
BY Munn & Co.
ATTORNEYS.

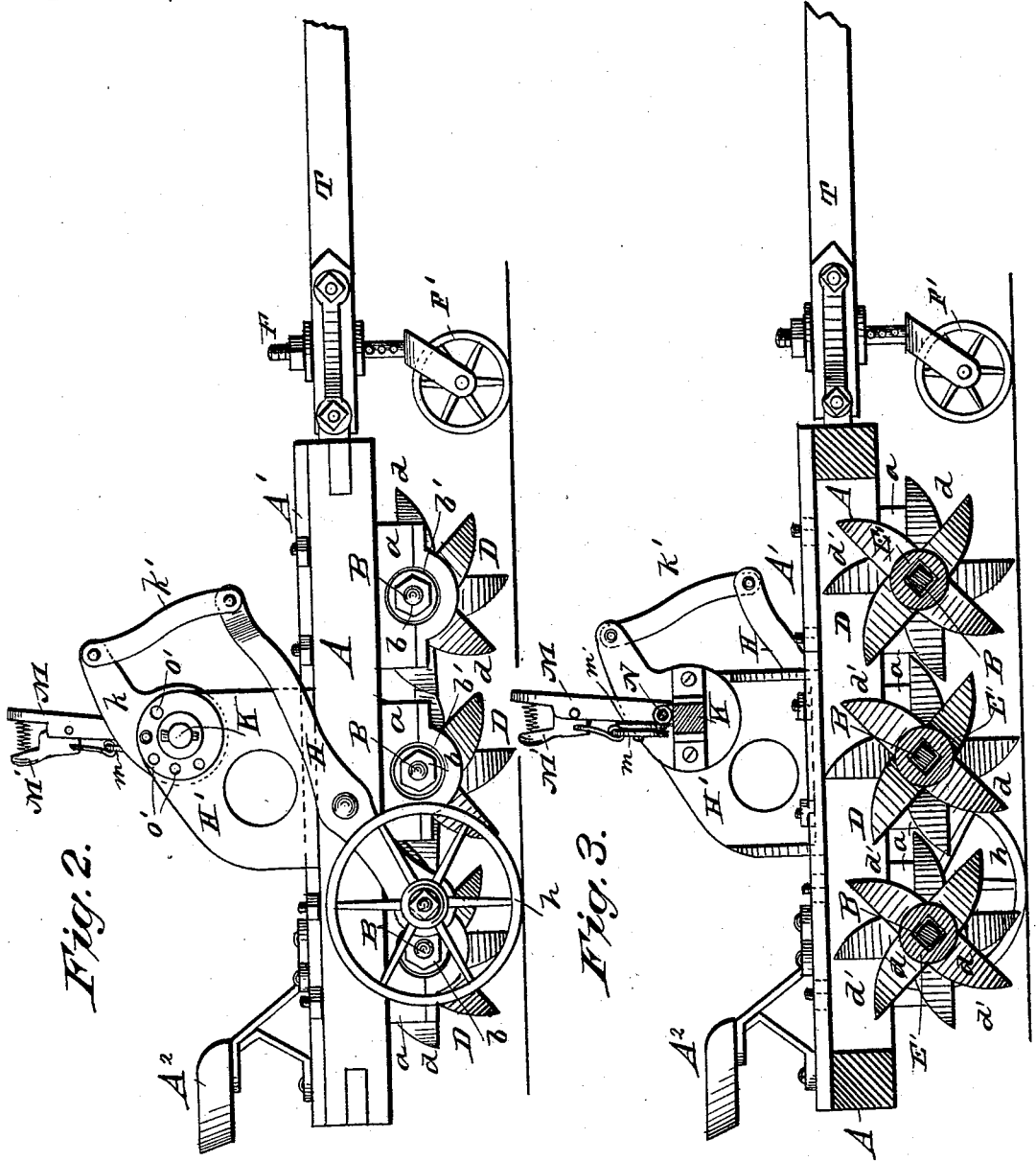

(No Model.) 3 Sheets—Sheet 3.
A. MADSON.
SOD CUTTER AND PULVERIZING HARROW.
No. 396,166. Patented Jan. 15, 1889.
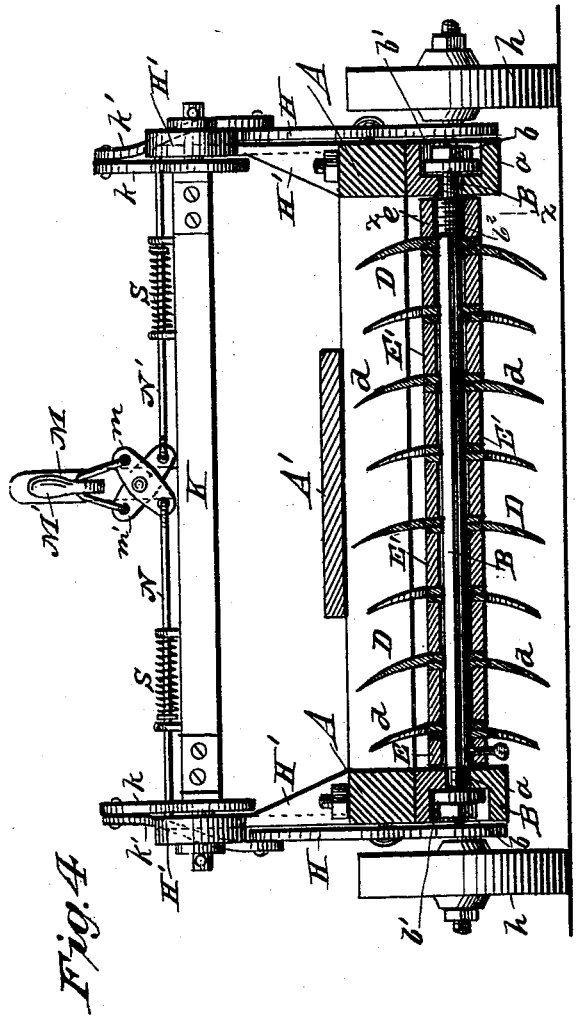
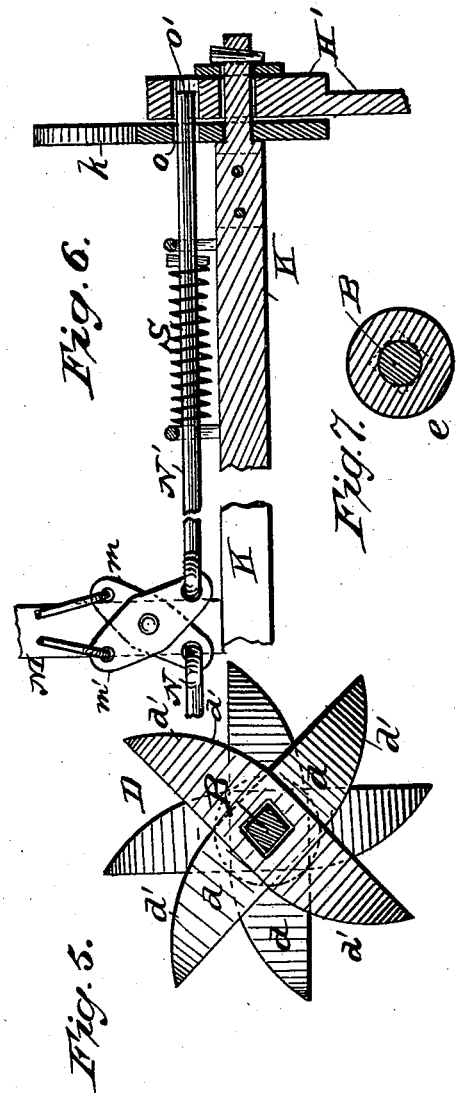
WITNESSES:
Phil. C. Dieterich.
C. Sedgwick.
INVENTOR:
A. Madson
BY Munn & Co.
ATTORNEYS.

UNITED STATES PATENT OFFICE.

ABRAHAM MADSON, OF FRENCHVILLE, WISCONSIN.

SOD-CUTTER AND PULVERIZING-HARROW.

SPECIFICATION forming part of Letters Patent No. 396,166, dated January 15, 1889.

Application filed June 20, 1888. Serial No. 277,652. (No model.)

*To all whom it may concern:*

Be it known that I, ABRAHAM MADSON, of Frenchville, in the county of Trempealeau and State of Wisconsin, have invented a new and Improved Sod-Cutter and Pulverizing-Harrow, of which the following is a full, clear, and exact description.

My invention relates to an improvement in sod-cutters and pulverizing-harrows, and has for its object to provide a simple, durable, and conveniently-operated apparatus wherein the sod or ground will be effectively broken in small particles, and also wherein the cutters may be regulated to any desired depth, and, further, wherein the apparatus may be carried from field to field without the cutters touching the ground.

The invention consists in the construction and combination of the several parts, as will be hereinafter fully set forth, and pointed out in the claims.

Reference is to be had to the accompanying drawings, forming a part of this specification, in which similar letters of reference indicate corresponding parts in all the figures.

Figure 1 is a plan view of the apparatus. Fig. 2 is a side elevation. Fig. 3 is a longitudinal vertical section on line $x\,x$ of Fig. 1. Fig. 4 is a transverse section on line $y\,y$ of Fig. 1. Fig. 5 is a transverse section through one of the cutter-shafts. Fig. 6 is a partial transverse section through the elevating device, and Fig. 7 is a detail sectional view on the line $z\,z$ in Fig. 4.

In carrying out the invention a preferably rectangular frame, A, is employed, constructed in any approved manner, usually consisting of parallel side and end pieces, as best shown in Fig. 1, the front and rear end pieces being usually connected by a central platform, A', upon which at the rear the seat $A^2$ is mounted.

Suitable hangers, $a$, are attached to the under face of the frame side pieces, the number whereof upon each side piece is made to correspond to the number of cutter-shafts employed, and the said hangers upon the respective side pieces of the frame are so placed as that they will be in transverse alignment.

In the several aligning hangers $a$ transverse shafts B are journaled, which shafts are polygonal a greater portion of their length, having their extremities reduced to enter the hangers, and the said extremities of the shafts are threaded and provided with a nut, $b$, adapted to enter a recess, $b'$, produced in the outer face of the hangers.

A series of cutters, D, are fixedly held at intervals upon the shaft B, which cutters preferably consist of two knives, $d$, curved in direction of their longitudinal axis, provided with a central polygonal slot, and a circular cutting-surface, $d'$, upon opposite sides at each end, the extremities being made to terminate in a point. Each set of cutters consists of two knives mounted upon the polygonal section of the shafts in such a manner that one knife will be at right angles to the other, forming a cross. If in practice it is deemed desirable, the cutters, instead of consisting of two pieces, may be constructed of one piece. In every event, however, the several points of the cutters incline in the same direction.

In placing the cutters upon the shafts a sleeve, E, is fixed in any approved manner at one extremity of the polygonal section and the first cutter is slid upon the shaft to an engagement with said sleeve. The other cutters are then placed upon the shaft and spaced by intervening loosely-mounted sleeves E', and so manipulated before being secured as that the blades of each alternate cutter will be essentially in alignment with the center of the space intervening the opposing edges of the cutter-blades to the rear and in advance, as best shown in Figs. 3, 4, and 5.

The several cutters are usually held in position by an interiorly-threaded sleeve, $e$, or nut, screwed upon a threaded surface, $b^2$, of the shafts B to an engagement with the outer central surface of the last cutter, the said threaded surface of the shaft approximating the end opposite to that upon which the first sleeve, E, is secured. I desire it, however, distinctly understood that the fixed sleeve may be omitted and a threaded sleeve be employed at each extremity of the shaft instead without departing from the spirit of the invention.

The several shafts carrying the cutters are so journaled that the curved surface of the blades mounted upon one shaft will be contiguous to the surface of the equivalent blade upon the next shaft, as best illustrated in Fig. 1. By this means the entire surface traversed by the apparatus is pulverized, as the cutter-blades of one shaft intervene the cutter-blades of the next shaft.

A lever, H, is pivoted centrally to each side bar of the frame, on the lower end of which bars the drive-wheels $h$ of the apparatus are studded, the upper ends of the said levers being made to project diagonally upward parallel with the outer face of brackets H', attached to the upper surface of said side bars at about the center of the same.

In the brackets H' a rock-shaft, K, is journaled, provided with a forwardly-inclined arm, $k$, near each end, which arms are pivotally united with the upper extremities of the levers by a connecting rod or link, $k'$, as best shown in Figs. 2 and 3.

A standard, M, is secured upon the center of the upper surface of the shaft K, and upon the lower front face of the said standard two levers, $m$ and $m'$, are centrally pivoted by one pivot-pin, the normal position of which levers is illustrated in Figs. 4 and 6, being diagonally one over the other. The upper ends of the levers $m$ and $m'$ are connected with opposite sides of a spring-actuated hand-lever, M', fulcrumed in the standard near the top, the lower ends of the said levers $m$ and $m'$ being respectively attached to horizontal rods N and N', adapted to reciprocate in suitable bearings upon the rock-shaft K.

The several rods N and N' are purposed to extend through an aperture, $o$, in the arms of the rock-shaft, and also through one of a series of apertures, $o'$, produced in the brackets around the bearings of the rock-shaft. The rods are normally held projected through the apertures aforesaid by the action of a spring, S, as best illustrated in Figs. 4 and 6.

It will be observed that when the hand-lever M' is pressed by the driver the rods N and N' are drawn inward out of engagement with the brackets. When this is accomplished, the shaft K may be revolved until the body is elevated or depressed the desired distance, the wheels serving as a fulcrum.

The shaft F, which is hinged to the forward end of the frame, is provided with a caster-wheel, F', adjustably secured thereto. The side wheels, $h$, and the elevating mechanism may be omitted, if desired.

Having thus described my invention, I claim as new and desire to secure by Letters Patent—

1. In a sod cutter and pulverizer, the combination, with a shaft, of a series of cutters, D, arranged upon the shaft, each cutter consisting of two knives, $d$, curved in the direction of their longitudinal axis and having circular cutting-edges $d'$, and each cutter being spaced and arranged with its blades in alignment with the space between the blades of the adjacent cutter, substantially as herein shown and described.

2. In a sod cutter and pulverizer, the combination, with the recessed hangers $a$ and the shaft B, having screw-threaded ends, of the cutters D, mounted on the said shaft, the sleeves E E', and the nuts $b\ b\ e$, substantially as herein shown and described.

3. In a sod cutter and pulverizer, the combination, with the supporting-frame, of the pivoted levers H, the wheels $h$, carried on the lower ends of the said levers, the rock-shaft K, provided with the arms $k$, the links connecting the arms $k$ to the levers H, and means for locking the rock-shaft in position, substantially as herein shown and described.

4. In a sod cutter and pulverizer, the combination, with the supporting-frame and apertured brackets carried thereby, of the pivoted levers H, the wheels $h$, carried by the said levers, the rock-shaft K, provided with the apertured arms $k$ and standard M, the links $k'$, connecting the arms $k$ and levers H, the levers $m\ m'$, pivoted to the standard M, the hand-lever M', connected to the said levers $m\ m'$, and the sliding and spring-actuated rods N N', for engaging the apertures of the brackets and arms $k$, substantially as herein shown and described.

ABRAHAM MADSON.

Witnesses:
HALVOR MARKRUD,
JOHN A. MADSON.